(12) United States Patent
Nefcy et al.

(10) Patent No.: US 9,555,795 B2
(45) Date of Patent: Jan. 31, 2017

(54) CONTROLLING A HYBRID VEHICLE HAVING AN OVERDRIVE COUPLING MEMBER

(71) Applicant: FORD GLOBAL TECHNOLOGIES, LLC, Dearborn, MI (US)

(72) Inventors: Bernard D. Nefcy, Novi, MI (US); Daniel Scott Colvin, Farmington Hills, MI (US); Andrew Cheng, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 61 days.

(21) Appl. No.: 14/593,072

(22) Filed: Jan. 9, 2015

(65) Prior Publication Data

US 2016/0200311 A1    Jul. 14, 2016

(51) Int. Cl.
| | | |
|---|---|---|
| *B60L 9/00* | (2006.01) | |
| *B60L 11/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |
| *B60W 20/00* | (2016.01) | |
| *B60W 10/06* | (2006.01) | |
| *B60W 10/08* | (2006.01) | |
| *F16H 3/48* | (2006.01) | |
| *B60K 6/365* | (2007.10) | |
| *B60K 6/383* | (2007.10) | |
| *B60K 6/445* | (2007.10) | |
| *B60W 10/02* | (2006.01) | |

(Continued)

(52) U.S. Cl.
CPC .............. *B60W 20/10* (2013.01); *B60K 6/365* (2013.01); *B60K 6/383* (2013.01); *B60K 6/445* (2013.01); *B60W 10/02* (2013.01); *B60W 10/06* (2013.01); *B60W 10/08* (2013.01); *F16H 3/48* (2013.01); *B60K 2006/4808* (2013.01); *B60W 2510/0275* (2013.01); *B60W 2510/0657* (2013.01); *B60W 2510/1005* (2013.01); *F16H 2003/007* (2013.01); *Y10S 903/902* (2013.01)

(58) Field of Classification Search
CPC ...... B60W 20/10; B60W 10/06; B60W 10/08; B60W 2510/0275; B60W 2510/0657; B60W 2510/1005; F16H 3/48; Y10S 903/902
USPC .................. 701/1, 22; 475/5, 269, 149, 223; 180/62.265, 65.21, 249, 247
See application file for complete search history.

(56) References Cited

U.S. PATENT DOCUMENTS

5,071,396 A * 12/1991 Kobayashi ......... B60K 17/3462
                                                180/248
5,846,155 A * 12/1998 Taniguchi ................ B60K 6/48
                                                180/65.25
(Continued)

*Primary Examiner* — Jaime Figueroa
(74) *Attorney, Agent, or Firm* — David B. Kelley; Brooks Kushman P.C.

(57) ABSTRACT

A hybrid vehicle includes an engine coupled to a planetary gearset and an electric motor configured to provide motor torque directly to a torque transfer set. An overdrive clutch is configured to, when engaged, bypass at least a portion of engine torque to an overdrive shaft directly connected to the torque transfer set. This allows the engine to also provide torque directly to the torque transfer set along with the motor in an overdrive mode of operation. At least one controller is programmed to control the motor and/or the engine based on an estimated amount of torque transferred through the overdrive clutch.

20 Claims, 4 Drawing Sheets

(51) Int. Cl.
 *B60K 6/48* (2007.10)
 *F16H 3/00* (2006.01)

(56) References Cited

U.S. PATENT DOCUMENTS

| | | |
|---|---|---|
| 6,595,338 B2 | 7/2003 | Bansbach et al. |
| 6,808,053 B2 | 10/2004 | Kirkwood et al. |
| 7,338,403 B2 | 3/2008 | Puiu |
| 7,452,305 B2 * | 11/2008 | Oliver ........................ F16H 1/28 475/214 |
| 8,287,411 B2 | 10/2012 | Lee et al. |
| 8,740,739 B2 | 6/2014 | Martin et al. |
| 2001/0022245 A1 * | 9/2001 | Rogg ..................... B60K 6/365 180/65.21 |
| 2006/0172849 A1 * | 8/2006 | Oliver ........................ F16H 1/28 475/269 |
| 2010/0069191 A1 * | 3/2010 | Swales ................... B60K 6/365 475/5 |
| 2013/0297108 A1 * | 11/2013 | Nefcy .................. B60W 10/08 701/22 |
| 2014/0031158 A1 * | 1/2014 | Hemphill ............... B60W 20/10 475/5 |
| 2014/0094336 A1 * | 4/2014 | Versteyhe ................ B60K 6/40 475/8 |
| 2016/0046276 A1 * | 2/2016 | Martin .................. B60W 10/06 701/22 |
| 2016/0061121 A1 * | 3/2016 | Martin .................... F02D 29/02 701/22 |

* cited by examiner

CONTROLLING A HYBRID VEHICLE HAVING AN OVERDRIVE COUPLING MEMBER

TECHNICAL FIELD

The present disclosure relates to a control strategy for controlling one or both of an engine and motor in a hybrid vehicle based on torque transferred through an overdrive clutch.

BACKGROUND

Hybrid electric vehicles include both an engine and at least one electric motor to provide drive torque to the wheels. There are various types of hybrid electric vehicles. For example, "parallel" hybrid vehicles typically include clutches that selectively enable either or both the engine and the motor to provide drive torque. A "series" hybrid vehicle typically includes an electric motor that is always driveably connected to the road wheels, and an engine that is not mechanically connected to the wheels. In other words, the engine does not provide any of the torque required to propel the vehicle. Rather, in a "series" hybrid vehicle, the engine powers a generator to produce electrical energy that is stored in the battery and/or used by the motor.

Various vehicles can include an overdrive gear selection enabling torque to be transmitted through an overdrive shaft. If an overdrive is provided in a hybrid electric vehicle, particular care must be taken to assure drivability is met while transitioning into and out of an overdrive mode. Due to the torque paths changing directions when entering and exiting overdrive mode, control of the engine and motor in the hybrid vehicle should be swift and accurate to ensure a smooth transition into and out of the overdrive mode.

SUMMARY

According to one embodiment, a vehicle comprises an engine and a planetary gearset configured to provide engine torque to a torque-transfer-set. A motor is configured to provide motor torque directly to the torque-transfer-set. A coupling member is configured to, when engaged, bypass at least a portion of engine torque to an overdrive shaft directly connected to the torque-transfer-set. A controller is programmed to control at least one of the engine and motor based on an estimated torque transferred through the coupling member.

In another embodiment, a vehicle comprises an engine, an electric motor, and a first mechanical linkage configured to selectively transmit engine torque and motor torque to an output. A second mechanical linkage defines a fixed speed relationship between the engine and the output. An overdrive-coupling-member is configured to selectively transmit engine torque to the second mechanical linkage. A controller is programmed to control the at least one of the engine and electric motor based on an estimated torque transferred through the overdrive-coupling-member.

In yet another embodiment, a method of controlling a vehicle is provided. The vehicle includes a planetary gearset coupling an engine to a mechanical linkage, and a motor coupled to the mechanical linkage, wherein the mechanical linkage is arranged to transmit motor torque and engine torque to an output. The method includes controlling at least one of the engine and motor based on an estimated torque transferred through an overdrive-coupling-member that selectively transmits engine torque to an overdrive shaft connected to the mechanical linkage.

DETAILED DESCRIPTION

Detailed embodiments of the present invention are disclosed herein. It is to be understood that the disclosed embodiments are merely exemplary of the invention that may be embodied in various and alternative forms. The figures are not necessarily to scale; some features may be exaggerated or minimized to show details of particular components. Specific structural and functional details disclosed herein are therefore not to be interpreted as limiting, but merely as a representative basis for teaching one skilled in the art to variously employ the present invention. As those of ordinary skill in the art will understand, various features of the embodiments illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to systems or methods for controlling torque and power output in a power-split hybrid electric vehicle. However, the teachings of the present disclosure may also be used in other applications and other hybrid vehicle configurations. Those of ordinary skill in the art may recognize similar applications or implementations with other vehicle configurations or technologies.

Figure 1:
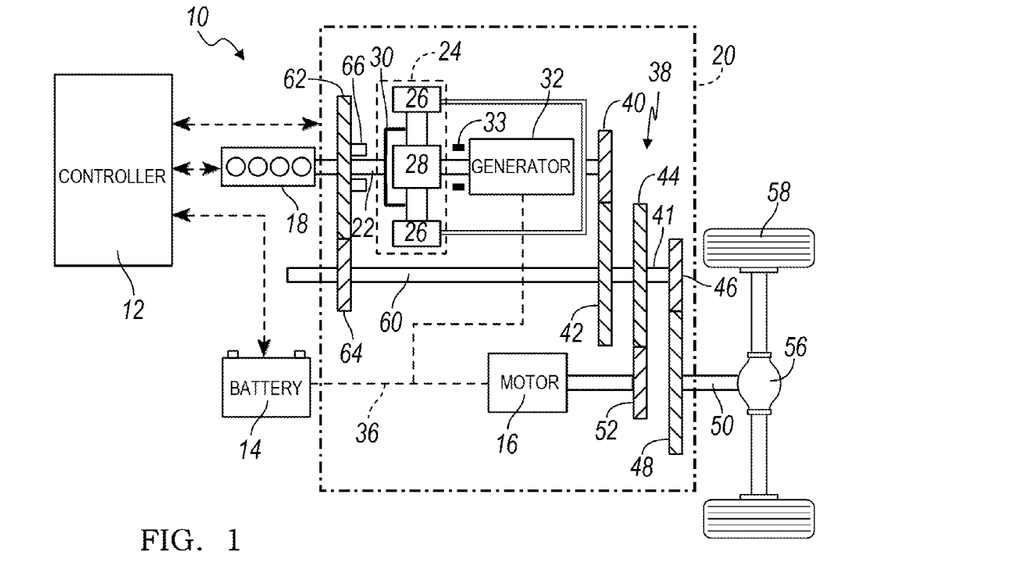
FIG. 1 is a schematic diagram of a hybrid electric vehicle according to one embodiment.

Referring to FIG. 1, a hybrid electric vehicle (HEV) includes a power-split powertrain 10. A vehicle system controller (VSC) and powertrain control module (PCM) 12 controls various aspects of the powertrain, such as an electric traction battery 14. One or more additional controllers can be present to control various aspects of the powertrain, as one of ordinary skill in the art would understand. And any and all combination of such controllers is hereinafter referred to as "a controller" or "one or more controllers".

The controller 12 controls the battery 14 two receive or store electric energy or, alternatively, supply electric energy to an electric fraction motor 16, via a two-way electrical connection. The controller 12 also controls the operation of an internal combustion engine (ICE) 18. Both the motor 16 and the engine 18 are capable of powering a transmission 20 that ultimately delivers torque to the wheels of the vehicle.

The engine 18 delivers power to a torque input shaft 22 that is connected to a planetary gear set 24 through an optional one way clutch (not shown). The input shaft 22 powers the planetary gear set 24 that includes a ring gear 26, a sun gear 28, and a planetary carrier assembly 30. In the embodiment illustrated, the input shaft 22 is driveably connected to the carrier assembly 30 to power the planetary gear set 24, although in other embodiments the input shaft 22 could drive the sun gear or ring gears 26. The sun gear 28 may be driveably connected to a generator 32. The generator 32 may be selectively engaged with the sun gear 28, such that the generator 32 may either rotate with the sun gear 28, or not rotate with it. An optional generator brake 33 may be provided between the generator 32 and the sun gear 28 to provide the selective engagement. When the generator brake 33 is not engaged and when the one way clutch couples the engine 18 to the planetary gear set 24, the generator 32 generates energy as a reactionary element to the operation of the planetary gear set 24. Electric energy generated from the generator 32 is transferred to the battery 14 through electrical connections 36. The battery 14 also receives and stores electric energy through regenerative braking, in known fashion. The battery 14 supplies the stored electric energy to the motor 16 for operation. The portion of the power delivered from the engine 18 to the generator 32 may also be transmitted directly to the motor 16. The battery 14, motor 16, and generator 32 are each interconnected in a two-way electric flow path through electrical connections 36.

The vehicle may be powered by the engine 18 alone, by the battery 14 and motor 16 alone, or by a combination of the engine 18 with the battery 14 and motor 16. In a first mode of operation, the engine 18 is activated to deliver torque through the planetary gear set 24. The ring gear 26 distributes torque to step ratio gears 38, acting as a torque transfer set, comprising meshing gear elements 40, 42, 44, and 46. Gears 42, 44, and 46 are mounted on a countershaft 41, and gear 46 distributes torque to gear 48. Gear 48 then distributes torque to a torque output shaft 50. In the first mode of operation, the motor 16 may also be activated to assist in the engine 18. When the motor 16 is active in assisting, gear 52 distributes torque to gear 44 and to the countershaft. In a second mode of operation, or EV mode, the engine 18 is disabled or otherwise prevented from distributing torque to the torque output shaft 50. In the second mode of operation, the battery 14 powers the motor 16 to distribute torque through the step ratio gears 38 and to the torque output shaft 50. The torque output shaft 50 is connected to a differential and axle mechanism 56 which distributes torque to traction wheels 58. The controller 12 controls the battery 14, engine 18, motor 16 and generator 32 in order to distribute torque to the wheels 58 in either the first mode of operation or the second mode of operation. Additional detail regarding the power sources and the power flow within the powertrain is provided and described with reference to FIG. 2.

To control the various mechanisms within the powertrain, the controller 12 receives information from sensors (not shown) such that the controller 12 can monitor speeds ω of the motor 16, engine 18 and/or generator 32. Of course, one or more speeds may be determined, inferred, or calculated based on known relationships and/or ratios among the various components. In addition, corresponding torques τ of the motor 16, generator 32, ring gear 26, sun gear 28, carrier assembly 30 and drive shaft 50 may be calculated, measured, or otherwise determined using any of a number of known techniques.

Figure 2:
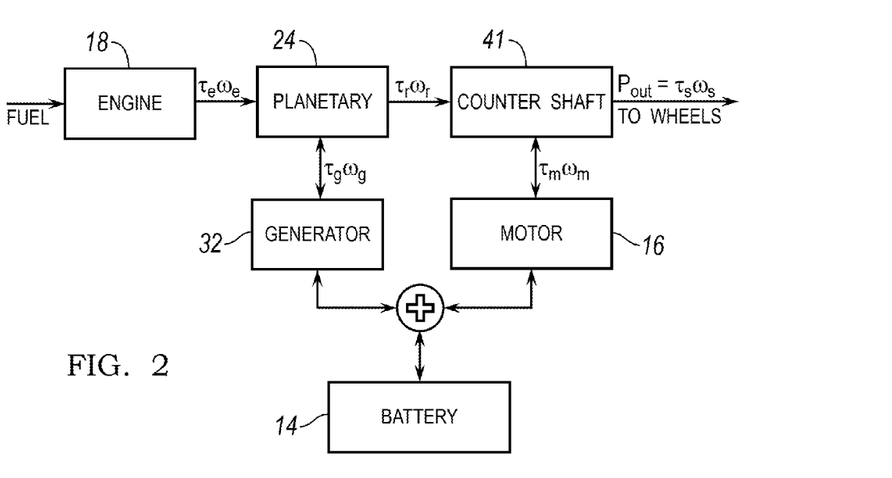
FIG. 2 is a block diagram illustrating power flow paths and torque flow paths between various components of a powertrain in a hybrid electric vehicle, according to one embodiment.

FIG. 2 illustrates a block diagram of power flow paths between the various components of the powertrain of FIG. 1 is shown. Fuel is delivered to the engine 18 under the control of the driver using an engine throttle. The engine 18 delivers engine power ($\tau_e \omega_e$, where $\tau_e$ is engine torque and $\omega_e$ is engine speed) to the planetary gearing arrangement 24. The planetary gearset 24 delivers power ($\tau_r \omega_r$, where $\tau_r$ is the ring gear torque and $\omega_r$ is the ring gear speed) to counter shaft 41. The output shaft 50 outputs power ($P_{out} = \tau_s \omega_s$, where $\tau_s$ and $\omega_s$ are the torque and speed of output shaft 38, respectively) to wheels 58. The generator 32 can deliver power to or be driven by planetary gearset 24. Similarly, power distribution between motor 16 and counter shaft 41 can be distributed in either direction. Driving power from the battery 14 or charging power to battery 14 is represented by the bi-directional arrow 36, corresponding to the high voltage bus 36 or voltage wires from FIG. 1.

The engine output power ($\tau_e \omega_e$) can be split into a mechanical power flow path ($\tau_r \omega_r$) and an electrical power flow path ($\tau_g \omega_g$ to $\tau_m \omega_m$, where $\tau_g$ is the generator torque, $\omega_g$ is the generator speed, $\tau_m$ is the motor torque, and $\omega_m$ is the motor speed). In this so-called "positive split" mode of operation, engine 18 delivers power to planetary gearset 24 which delivers power ($\tau_r \omega_r$) to counter shaft 41 which in turn drives wheels 58. A portion of the planetary gearing power ($\tau_g \omega_g$) is distributed to generator 32, which delivers charging power to battery 14. Battery 14 drives motor 16, which distributes power ($\tau_m \omega_m$) to counter shaft 41.

If a generator brake 33 is provided and activated, a "parallel operating" mode of operation can be established. In the parallel operating configuration, the engine 18 is on and generator 32 is braked. The battery 14 powers the motor 16, which powers counter shaft 41 simultaneously with delivery of power from engine 18 to planetary gearset 24 to counter shaft 41. During operation with the second power source (described as including battery 14, motor 16, and generator 32), motor 16 draws power from battery 14 and provides propulsion independently from engine 18 to the drivetrain.

If the generator 32, due to the mechanical properties of the planetary gearset 24, acts as a power input to the planetary gearset 24 to drive the vehicle, a "negative split" mode of operation can be established. In this mode, the engine 18 can be in operation and the generator 32 can be used as a motor against the engine 18 to reduce its speed. This enables a regulation on the engine speed at high vehicle speeds and at a low power demand, for example.

As described, the HEV has two power sources for delivering driving power to wheels 58. The first power source includes engine 18 and the second power source includes battery 14. Engine 18 and battery 14 can provide traction power either simultaneously or independently. The controller 12 controls the electric energy and fuel energy proportioning to meet the propulsion requirements and thereby controls engine 18 and battery 14 accordingly.

As may be observed, the planetary gearing arrangement 24 imposes speed and torque relationships among the engine 18, generator 32, and the vehicle traction wheels 58. As discussed above, the generator 32 may be controlled to transfer power from the engine 18 to vehicle traction wheels 58 using the planetary gearing arrangement 24 as a CVT. However, at some operating conditions, the losses incurred by operating the generator 32 exceed the energy benefit of the CVT.

Referring back to FIG. 1, a controllable overdrive system is also provided. In particular, an overdrive shaft 60 is coupled to gear element 62, which is in meshing rotation with gear element 64. An Overdrive Gear Synchronizer (ODS), or overdrive clutch 66, is operable to selectively couple gear element 64 to the engine 18 along the input shaft 22. Engagement of the clutch 66 enables the transmission to engage in overdrive and to provide torque directly from the engine 18. Meshing gearing elements 64 and 62 have a fixed gear ratio configured to define an overdrive speed and torque relationship between the engine 18 and the output shaft 50 when the clutch 66 is engaged. This allows torque to be supplied mechanically from the engine 18 to the wheels 58; engine power is no longer split into the electric path when the clutch 66 is fully engaged. Engaging the clutch 66 to put the vehicle in an overdrive mode increases overall fuel economy when operating at high speeds and high power demand.

The controller 12 is configured to selectively command the clutch 66 to engage or disengage in response to various operating conditions, as will be discussed below. Other gearing arrangements that impose an overdrive speed relationship between the engine 18 and the output shaft 50 may, of course, be utilized.

In one embodiment, the clutch 66 is a dog clutch, synchronizer, or electronically controlled hydraulic rocker one-way clutch. Additional disclosure of examples of the structure of the clutch 66 is provided below.

Figure 3:
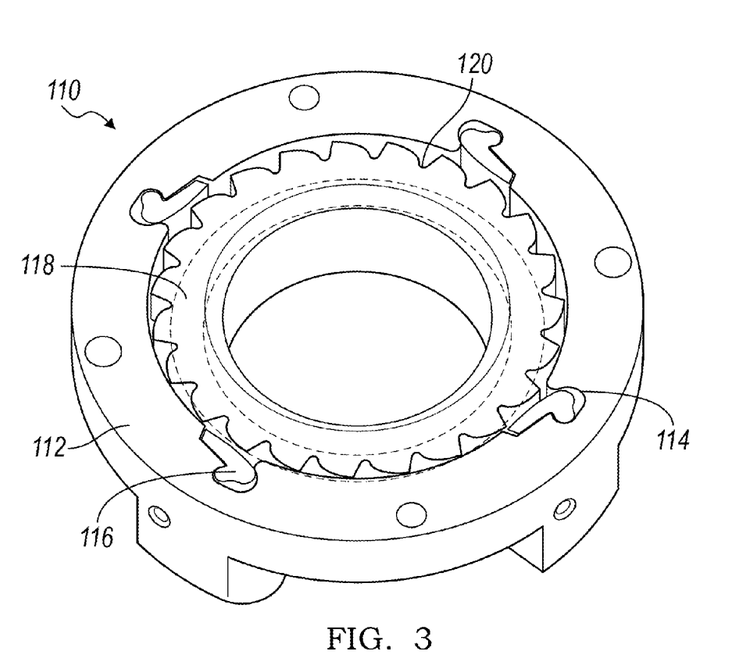
FIG. 3 is a perspective view of an overdrive clutch according to one embodiment.
Figure 4:
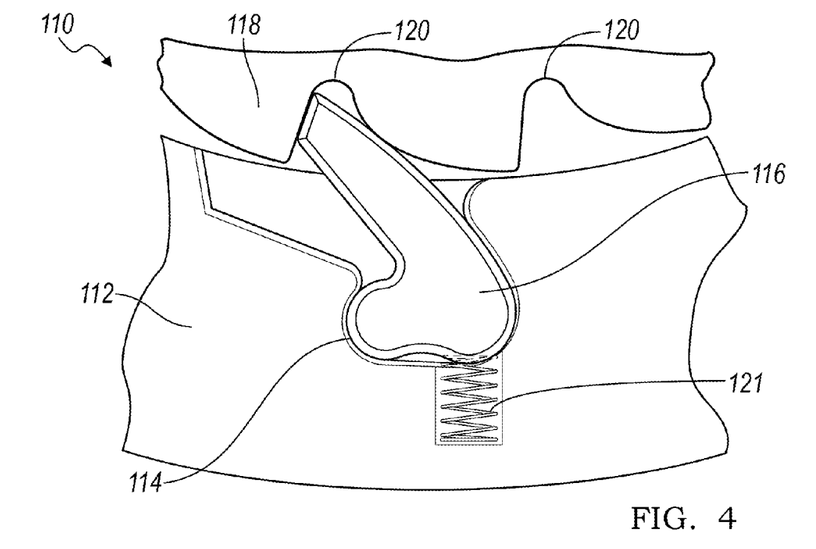
FIG. 4 is a top sectional view of the overdrive clutch of FIG. 3.
Figure 5:
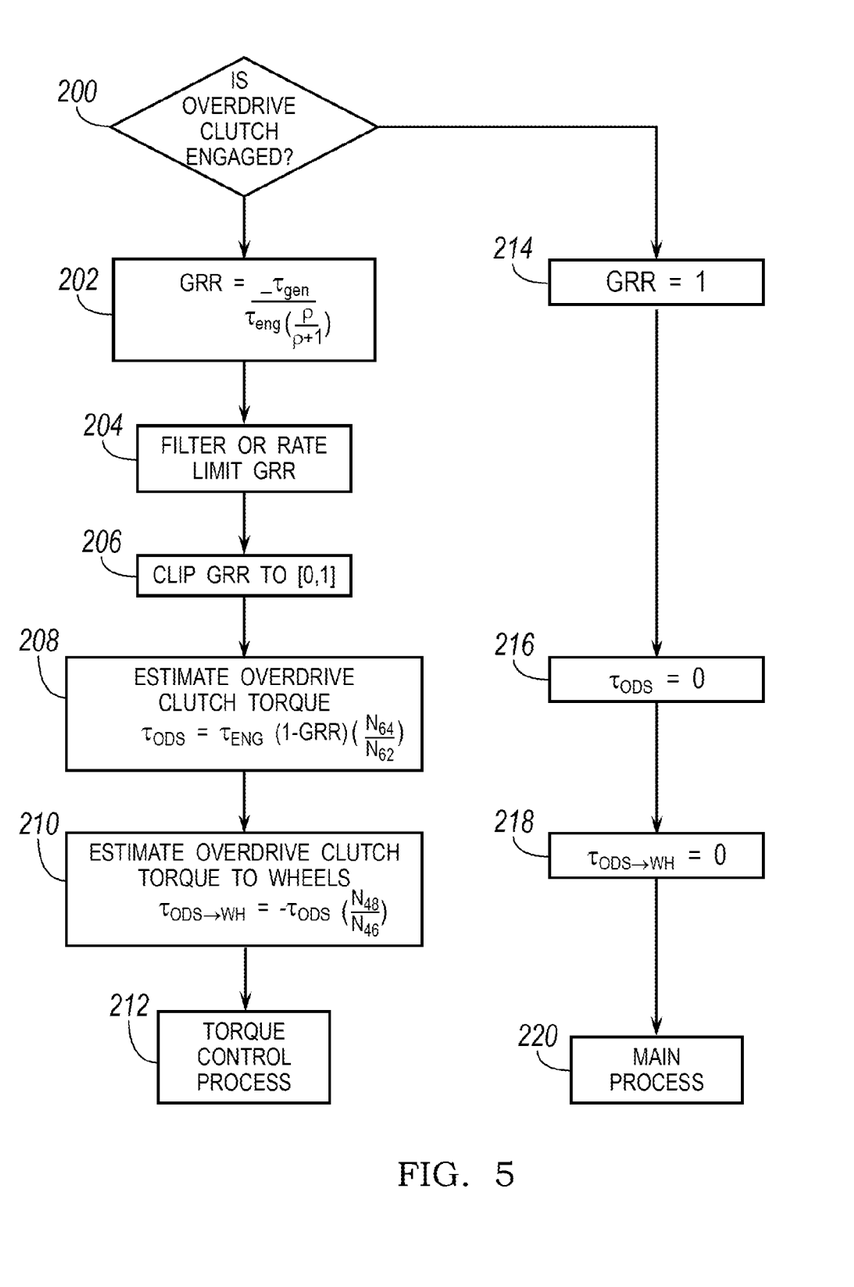
FIG. 5 is a flow chart illustrating an algorithm implemented by at least one controller to control powertrain components based on estimated torque transferred through the overdrive clutch, according to one embodiment.

Referring to FIGS. 3 and 4, one embodiment of the clutch 66 is illustrated in more detail. In this embodiment, the clutch 66 is an electromagnetic one-way clutch 110. The one-way clutch 110 includes a rocker plate 112 having pockets 114, each pocket 114 containing a corresponding rocker 116 which is pivotally hinged within the respective pockets 114. The clutch 110 also includes a cam plate 118, which has a plurality of notches 120 that define teeth. When the rockers 116 are pivoted relative to the pockets 114, the teeth may catch inwardly extending portions of the rockers 116. The rockers 116 are biased by a spring 121 to remain within the pockets without protruding. In this configuration, there is no engagement between the rockers 116 and the notches 120, and thus no torque is transferred between the rocker plate 112 and cam plate 118. FIG. 5 illustrates the clutch 110 in this disengaged position.

The cam plate 118 contains a coil (not illustrated) that may be selectively electrified to produce a magnetic force and engage the clutch 110. In response to the magnetic force, the rockers 116 pivot outward from the pockets 114, against the bias force of the spring 121, such that a portion of the rockers 116 protrudes beyond a radially inward face of the rocker plate 112. The protruding portion of the rockers 116 may engage with the notches 120 and transfer torque between the rocker plate 112 and cam plate 118 in one direction of rotation. FIG. 4 illustrates the clutch 110 in this engaged position.

Referring to FIGS. 1-4, and as described above, the overdrive clutch 66 can be controlled to activate an overdrive mode. During the transition between a normal operating mode and an overdrive mode (i.e., when the clutch is being engaged), torque is transferring through both the ring gear 26 and the overdrive clutch 66. Care must be taken for a smooth transition and increased drivability during these times. Energy loss should also be minimized. For example, if the overdrive clutch 66 is engaged during the negative split mode of operation, there exist potential power savings in the losses of the generator at this condition (~1 kW or more). According to embodiments described below, a control strategy is provided to control the powertrain 10, such as the motor 16, the engine 18, and the overdrive clutch 66, during transition into or out of overdrive mode.

According to various aspects of the present disclosure, a method and control system is provided for controlling the powertrain based on an estimated amount of torque transferred through the overdrive clutch during engagement of the clutch to smooth the transition into and out of overdrive mode. To do so, a generator reaction ratio (GRR) can be determined and implemented into the normal powertrain torque calculations. The GRR is a ratio of generator torque to engine torque, accounting for the gears in the planetary gearset 24:

$$GRR = -\frac{\tau_{gen}}{\tau_{eng}\left(\frac{\rho}{\rho+1}\right)} = -\frac{\tau_{gen}\left(\frac{\rho+1}{\rho}\right)}{\tau_{eng}} \quad (1)$$

where $\tau_{gen}$ is the torque of the generator 32, $\tau_{eng}$ is the torque of the engine 18, and $\rho$ is a ratio ($N_s/N_r$) of the number of teeth ($N_s$) in the sun gear 28 compared to the number of teeth ($N_r$) in the ring gear 26. In one example, the sun gear has 34 teeth ($N_s=34$) and the ring gear has 86 teeth ($N_r=86$), yielding a ratio $\rho$ of 0.395.

Utilizing the GRR, torque values can be computed and compared to estimate the torque in the overdrive clutch. For example, $$\tau_{ODS} = -(1 - GRR)\left(\frac{N_{64}}{N_{62}}\right)(\tau_{eng}) \quad (2)$$

where $\tau_{ODS}$ is the torque transmitted through the overdrive clutch 66, $N_{64}$ is the number of teeth in gear element 64, and $N_{62}$ is the number of teeth in gear element 62. In one example, the gear element 62 has 83 teeth ($N_{62}=83$), and the gear element 64 has 59 teeth ($N_{64}=59$). The relationship in equation (2) provides an estimate of the torque transmitted through the overdrive clutch 66 based on the torque output by the engine and the ratio of generator torque to engine torque (GRR), accounting for the gear ratio in the overdrive meshing gear elements 62 and 64.

Additionally, the torque through the ring gear 26 during synchronization of the overdrive clutch can be represented as follows:

$$\tau_{ring} = -\frac{1}{\rho+1}(\tau_{eng})(GRR) \quad (3)$$

where $\tau_{ring}$ is the torque transmitted through the ring gear 26. The torque through the ring gear 26 ($\tau_{ring}$) can be utilized in the main controls of the powertrain which are not described in detail in the present disclosure.

Knowing the estimated torque transferred through the overdrive clutch ($\tau_{ODS}$), the outputs of the engine 18 and the motor 16 can be controlled to assure a smooth transition into, or out of, overdrive mode, when the overdrive clutch is transitioning between being engaged and disengaged. For example, the overdrive clutch torque to the wheels can be represented as follows:

$$\tau_{ODS \to O} = -\tau_{ODS}\left(\frac{N_{48}}{N_{46}}\right) \quad (4)$$

where $\tau_{ODS\_O}$ is the overdrive clutch torque to the output shaft 50, accounting for a gear ratio $$\left(\frac{N_{48}}{N_{46}}\right),$$

and $N_{46}$ and $N_{48}$ are the number of teeth on gears 46 and 48, respectively, that transfer torque from the overdrive clutch to the output shaft 50. Of course, any number of gear ratios can be present that effectively change the rotational speed while transmitting torque therethrough. In one example, $N_{46}$ is 23, and $N_{48}$ is 59, yielding a gear ratio of 2.565.

Using the variables and findings described above, the overall torque transferred through the output shaft 50 can be represented by the following:

$$\tau_{out} = \frac{C_{R \to O}}{1+\rho} \cdot \tau_{eng} \cdot GRR + \tau_{M \to O} + (\tau_{ODS \to O}) \quad (5)$$

where $\tau_{out}$ is the torque transferred through the output shaft 50, $C_{R \to O}$ is the gear ratio conversion from the ring gear to the output (i.e., accounting for gears 40, 42, 46, and 48), and $\tau_{M \to O}$ is the motor torque at the output, accounting for gear ratio conversions (i.e., accounting for gears 52, 44, 46, and 48). The gear ratio conversion from the ring gear to the output $C_{R \to O}$ when multiplied by the engine torque $\tau_{eng}$ yields the engine torque at the output. Using equation (5) above, the torque output of the engine 18 and motor 16 can be modulated during engagement or disengagement of the overdrive clutch 66 to assure that the overall torque output $\tau_{out}$ meets a demanded torque while inhibiting shock realized when engaging or disengaging the clutch 66. For example, the output of the motor 16 may be modulated more quickly than that of the engine 18, and therefore the motor 16 may be controlled to increase or decrease its torque output based on the generator reaction ratio GRR and other relationships described above when the clutch 66 is engaged/disengaged. Other situations, such as during a low state of charge of the battery, may dictate that the engine output be modulated rather than the motor output. Of course, either or both of the engine and motor outputs may be controlled based on the relationships described above.

FIG. 5 is a flowchart representing one example of a control strategy implemented by the controller to control at least one of the engine and motor based on an estimated torque transferred through the clutch, as further described above. At 200, the controller determines whether the overdrive clutch is engaged or disengaged. This can be accomplished in a variety of known fashions, such as by reading signal inputs from sensors in or around the clutch, or determining a rotational speed difference on opposing sides of the clutch.

If the clutch is at least partially engaged, including times in which the clutch is first commanded to engage and is "slipping," the generator reaction ratio (GRR) can be determined according to equation (1) above at 202. The GRR is filtered or subject to a rate limit at 204 to smoothen the GRR over time, preventing unwanted spikes of torque readings to interfere with operation of the engine or motor controls. At 206, the GRR is then clipped with 0 and 1 at a respective minimum and maximum so that the GRR is not be negative and does not exceed 1. The resulting GRR after 206 is a value between 0 and 1 to be used in overdrive clutch torque estimation.

At 208, the controller estimates the overdrive clutch torque utilizing the clipped and filtered GRR, according to equation (2). The estimated overdrive clutch torque can be used in calculating the estimated overdrive clutch torque at the output at 210, according to equation (4). Thereafter, a torque control process at 212 can be utilized by the controller to control the torque and power outputs of the engine and motor to maintain drivability of the vehicle, while meeting demanded torques and powers, particularly during times of entering and exiting the overdrive mode. For example, the motor torque may be modulated by an amount based on the GRR and other variables above in order to maintain driver demands.

If it is determined at 200 that the overdrive clutch is not engaged, the GRR is set to 1 at 214. This essentially withdraws any generator reaction ratio in any of the above equations, allowing the engine, motor and generator to operate under normal operating conditions. Furthermore, there is no torque being transmitted through the open clutch as indicated at 216 and 218. The main drive process 220 is run in which the hybrid vehicle is controlled in a normal fashion, i.e., not in overdrive.

Figure 6:
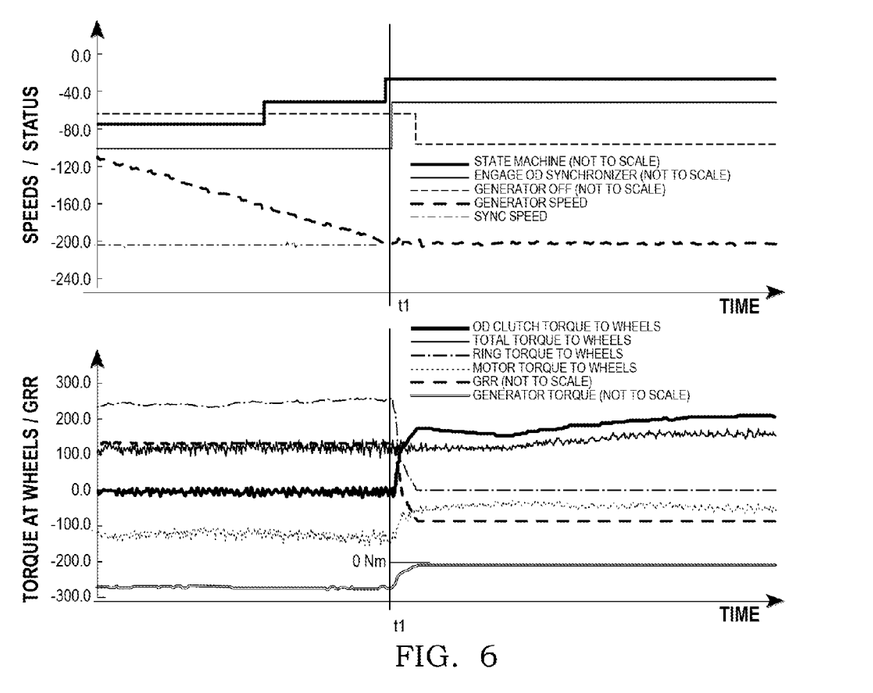
FIG. 6 is a graphical representation of various speeds and torques during an engagement of the overdrive clutch, according to one embodiment.

FIG. 6 represents a plotted example of various torques and speeds during engagement of the overdrive clutch, being commanded to engage at $t_1$. Prior to $t_1$, the speed of the generator is increasing in the negative direction while the torques of each powertrain component remains relatively steady. Once the overdrive clutch is commanded to engage at $t_1$, the calculated GRR reduces while the overdrive clutch torque to wheels increases. The ring torque to the wheels and generator torque decreases sharply to zero due to the overdrive clutch activation, and the motor torque to the wheels is commanded to decrease (commanding less torque in the negative direction) since the generator at 0 Nm decreases the electrical power requirement. The total torque to the wheels is maintained and slightly ramps up according to the increased demanded torque after the overdrive mode is active at $t_1$.

While a description is provided above regarding torque and power transferred through an overdrive clutch, it should be understood that the generator brake can also act as an overdrive clutch. In particular, if the generator is braked via brake 33, and if the clutch 66 is either not provided or is open, the power from the engine can bypass the electrical flow path through the generator and instead transfer directly to the gears 38. This, like the use of the clutch 66, provides a fixed speed relationship between the output of the engine and the output of the gears 38.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
an engine;
a planetary gearset configured to provide engine torque to a torque-transfer-set;
a motor configured to provide motor torque directly to the torque-transfer-set;
a coupling member configured to, when engaged, bypass at least a portion of engine torque to an overdrive shaft directly connected to the torque-transfer-set; and
a controller programmed to control at least one of the engine and motor based on an estimated torque transferred through the coupling member.

2. The vehicle of claim 1, wherein the engine includes an engine output, and wherein the planetary gearset and the coupling member are coupled to the engine output.

3. The vehicle of claim 1, further comprising a generator coupled to the planetary gearset and configured to convert at least a portion of engine torque into electric energy to be stored in a battery.

4. The vehicle of claim 3, wherein the estimated torque transferred through the coupling member is based on ratio of generator torque to engine torque.

5. The vehicle of claim 4, wherein the estimated torque transferred through the coupling member is further based on a predetermined gear ratio within the planetary gearset.

6. The vehicle of claim 4, wherein the planetary gearset includes a sun gear, a planet carrier, and a ring gear, and wherein the sun gear is coupled to an output of the engine and the ring gear is coupled to the torque-transfer-set.

7. The vehicle of claim 4, wherein the controller is further programmed to modify output of the motor to maintain a desired power output of the torque-transfer-set based on the estimated torque transferred through the coupling member.

8. A vehicle comprising:
an engine;
an electric motor;
a first mechanical linkage configured to selectively transmit engine torque and motor torque to an output;
an overdrive-coupling-member configured to selectively transmit engine torque to a second mechanical linkage defining a fixed speed relationship between the engine and the output; and
a controller programmed to control the at least one of the engine and electric motor based on an estimated torque transferred through the overdrive-coupling-member.

9. The vehicle of claim 8, further comprising a planetary gearset coupled to the first mechanical linkage, and a generator coupled to the planetary gearset and configured to convert at least a portion of engine torque into electric energy to be stored in a battery.

10. The vehicle of claim 9, wherein the estimated torque transferred through the overdrive-coupling-member is based on a ratio of generator torque to engine torque.

11. The vehicle of claim 10, further comprising a planetary gearset coupled to the first mechanical linkage, wherein the estimated torque transferred through the overdrive-coupling-member is further based on a predetermined gear ratio within the planetary gearset.

12. The vehicle of claim 10, wherein the planetary gearset includes a sun gear, a planet carrier, and a ring gear, and wherein the sun gear is coupled to an output of the engine and the ring gear is coupled to the first mechanical linkage.

13. The vehicle of claim 10, wherein the controller is further programmed to modify output of the electric motor to maintain a desired power output of the first mechanical linkage based on the estimated torque transferred through the overdrive-coupling-member.

14. The vehicle of claim 9, wherein the overdrive-coupling-member is disposed between the engine and the planetary gearset.

15. The vehicle of claim 9, wherein the overdrive-coupling-member is a generator brake configured to inhibit rotation of the generator and a gear of the planetary gearset.

16. A method of controlling a vehicle having a planetary gearset coupling an engine to a mechanical linkage, and a motor coupled to the mechanical linkage, the mechanical linkage arranged to transmit motor torque and engine torque to an output, the method comprising:
controlling at least one of the engine and motor based on an estimated torque transferred through an overdrive-coupling-member that selectively transmits engine torque to an overdrive shaft connected to the mechanical linkage.

17. The method of claim 16, further comprising providing a fixed speed relationship between the engine and the output via the overdrive-coupling-member when engaged.

18. The method of claim 16, further comprising modifying output of the motor to maintain a desired power output of the mechanical linkage based on the estimated torque transferred through the overdrive-coupling-member.

19. The method of claim 16, wherein the vehicle further includes a generator coupled to the planetary gearset, the method further comprising estimating the estimated torque transferred through the overdrive-coupling-member based on a ratio of generator torque to engine torque.

20. The method of claim 19, wherein the estimating includes estimating torque transferred through the overdrive-coupling-member further based on a predetermined gear ratio within the planetary gearset.

* * * * *